US008271647B2

(12) United States Patent
Conway

(10) Patent No.: US 8,271,647 B2
(45) Date of Patent: *Sep. 18, 2012

(54) METHOD AND SYSTEM FOR ENERGY EFFICIENT ROUTING AND NETWORK SERVICES

(75) Inventor: Adrian E. Conway, Weston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/004,230

(22) Filed: Jan. 11, 2011

(65) Prior Publication Data

US 2011/0106945 A1 May 5, 2011

Related U.S. Application Data

(63) Continuation of application No. 12/059,384, filed on Mar. 31, 2008, now Pat. No. 7,958,229.

(51) Int. Cl.
*G06F 13/00* (2006.01)

(52) U.S. Cl. .......... 709/224; 709/225; 709/250
(58) Field of Classification Search .......... 709/223, 709/224, 225, 250
See application file for complete search history.

(56) References Cited

U.S. PATENT DOCUMENTS

| 7,634,671 | B2 | 12/2009 | Frietsch et al. | |
| 7,877,235 | B2* | 1/2011 | McConnell et al. | 702/188 |
| 2007/0208848 | A1 | 9/2007 | Bhesania et al. | |
| 2008/0317021 | A1* | 12/2008 | Ives et al. | 370/389 |
| 2009/0177505 | A1* | 7/2009 | Dietrich et al. | 705/7 |
| 2009/0195349 | A1* | 8/2009 | Frader-Thompson et al. | 340/3.1 |
| 2009/0204382 | A1* | 8/2009 | Tung et al. | 703/21 |

* cited by examiner

*Primary Examiner* — Viet Vu

(57) ABSTRACT

A method and system of an embodiment may include identifying a power source used by a network element, determining a carbon footprint of a unit of power usage from the power source, identifying one or more components associated with the network element used for a network operation performed by the network element, determining the power usage of the one or more identified components during the process, and calculating the carbon footprint of the process performed by the network element.

22 Claims, 5 Drawing Sheets

METHOD AND SYSTEM FOR ENERGY EFFICIENT ROUTING AND NETWORK SERVICES

CROSS-REFERENCE TO RELATED APPLICATIONS

This continuation application claims the benefit of U.S. application Ser. No. 12/059,384 filed Mar. 31, 2008, the disclosure of which is expressly incorporated herein by reference in its entirety.

BACKGROUND INFORMATION

Reducing emissions and the impact of human activities on the environment is becoming increasingly important due to concerns about global warming and energy costs. Measuring the environmental impact of certain activities, such as driving vehicles may be determined by many consumers. Other activities, such as network related activities may be very complex and the power usage and the environmental impact may be difficult to determine. The components of networks and their power usage may not be known to consumers and evaluating the impact may be difficult for consumers or even network operators or service providers. Services offered by networks may be provided by multiple components and the components may vary for each instantiation of a service. The impact of a networking activity may depend on not only the amount of power used but also on the source of that power. The source of power may be difficult to determine for network components and services. Calculating the power usage of a complex activity such as networking may be difficult and may use more power than potential savings.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF PREFERRED EMBODIMENTS

An exemplary embodiment provides a system for energy efficient routing and network services. The system for energy efficient routing and network services may calculate a measure of the impact of one or more network operations performed by a network component or as part of a network service. A network operation may include a single step performed as part of the function of a network element such as a single step performed in the process of routing a packet or instantiating a network service. The system may determine the power usage and/or carbon footprint of one or more networking components or network services utilizing measurements and/or estimates. The system may receive carbon footprint information from a power supplier or input by a user and may utilize the carbon footprint information to determine the carbon footprint of one or more network components or services.

Figure 1:
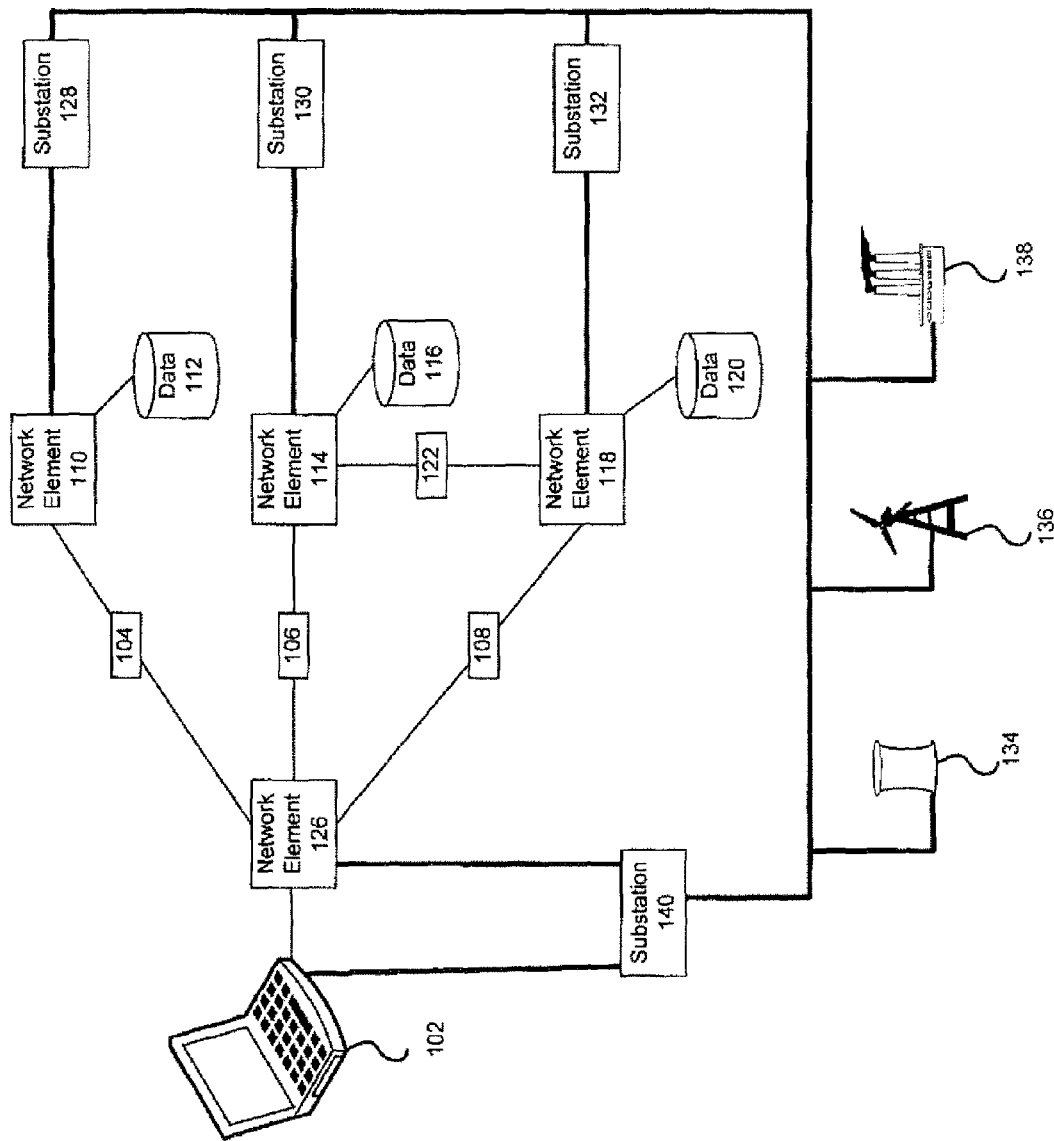
FIG. 1 is a block diagram of a system for energy efficient routing and network services, in accordance with an exemplary embodiment.

Referring to FIG. 1, a system for energy efficient routing and network services in accordance with an exemplary embodiment is illustrated. System 100 illustrates an exemplary system for calculating the environmental impact of one or more network activities or components. It is noted that System 100 is a simplified view of a network and may include additional elements that are not depicted. As illustrated, network client 102 may connect to network elements 110, 114, and 118 via network element 126 and network paths 104, 106, and 108, respectively. Network client 102 may be indirectly connected to one or more additional network elements such as network element 114 and 118 via network path 122. Network elements 110, 114, 118, and 126 may be communicatively coupled to one or more data storage mechanisms, such as data storage 112, 116, and 120. Network elements 110, 114, 118, and 126, network client 102, data storage 112, 116, and 120 and other components of system 100 may be connected to one or more power sources via power substations 128, 130, 132, and 140. Power substations may receive power from a power grid which may be supplied by one or more power sources such as power sources 134, 136, and 138.

Network client 102 may be a device capable of sending and receiving network signals such as a personal digital assistant, portable computer, desktop computer, workstation, server, cellular telephone, television, set top box or other device. Network client 102 may transmit and/or receive data to and/or from network elements. The data may be transmitted and/or received utilizing a standard telecommunications protocol or a standard networking protocol. For example, one embodiment may utilize Session Initiation Protocol (SIP). In other embodiments, the data may be transmitted and/or received utilizing other Voice Over IP (VOIP) protocols. Data may also be transmitted and/or received using Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and/or systems suitable for transmitting and receiving data. Data may be transmitted and/or received wirelessly or may utilize cabled network or telecom connections such as an Ethernet RJ45/Category 5 Ethernet connection, a fiber connection, a FIOS connection, a traditional phone wireline connection, a cable connection or other wired network connection. Network client 102 may use standard wireless protocols including IEEE 802.11a, 802.11b and 802.11g. Network client 102 may also be connected to network elements via protocols for a wired connection, such as an IEEE Ethernet 802.3.

Network elements 110, 114, 118, and 126 may be part of a local area network (LAN), a wide area network (WAN), the Internet, cellular networks, satellite networks or other networks that permit the transfer and/or reception of data to and/or from network clients and network elements. Network elements 110, 114, 118, and 126 may utilize one or more protocols of network client 102. Network elements 110, 114, 118, and 126 may translate to or from other protocols to one or more protocols of network client 102.

Network elements 110, 114, 118, and 126 may be transmission links, switches, routers, servers, databases, network interface cards, link amplifiers, link regenerators, radio transmitters, cellular radios, software-defined radios, switches, routers, gateways, and softswitches or other devices utilized to provide or support network operations and services. Network elements 110, 114, 118, and 126 may include one or more processors (not shown) for recording, transmitting, receiving, and/or storing data. Although network elements 110, 114, 118, and 126 are each depicted as single network elements, it should be appreciated that the contents of network elements may be combined into fewer or greater numbers of devices. For example, network element 110 may be connected to one or more servers, routers, databases or other network elements. Furthermore, the network elements may be local, remote, or a combination thereof to network element 110. Additionally, portions of network element 110 functionality may be implemented on network client 102. The components of one or more network elements may be determined in order to assess the power usage and/or carbon footprint of a network routing or network services offered by the one or more network elements.

In order to determine the impact of power usage for a network service and/or a network component on the environment, measures in addition to power usage, such as the carbon footprint of the power used, may be determined. The carbon footprint may be calculated as the total amount of carbon dioxide ($CO_2$) and other greenhouse gases produced by a network service and/or a network element. Other methods of calculating the carbon footprint may be utilized. To calculate the carbon footprint, a power source for a network element, network facility or other component providing or supporting a network service may be determined. Once a power source is determined, an associated carbon footprint per unit of power may be determined. A supplier of power may provide information on $CO_2$ emissions per unit of power. For example, returning to FIG. 1, network elements 110, 114, 118, and 126 may be connected to power substations 128, 130, 132, and 140. Power substations 128, 130, 132, and 140 may receive power from power sources 134, 136, and 138. Power sources 134, 136, and 138 may be separate power sources with different carbon footprints per unit of power that may be connected to a power grid and may serve different regions. For example, power source 134 may be a nuclear power plant which may have a lower carbon footprint per unit of power than power source 138 which may be a coal burning power plant. Power source 136 may be a wind power generation plant which may have a lower carbon footprint that power source 134 or power source 138. The carbon footprint of other power sources may be measured such as the carbon footprint of hydroelectric generating plants, hydrothermal generating plants, tidal generating power systems, solar generating power systems, other power systems or combinations thereof. Determining a power source for a network element, network facility or other component providing or supporting a network service may depend on the time of day, the day of the week, the season or on other factors. For example, the amount of power supplied by a solar power generation system or wind generated source may depend on environmental conditions such as the amount of wind or sunlight available. A power supplier may supply power to a power substation from different power sources depending on the cost of power from that power source, the availability of power from that power source, the proximity of the power source to the power suppliers customers or other factors. A network element or other component supplying or supporting a network service may receive network power from a power supplier utilizing multiple power sources concurrently. Determining a carbon footprint for a network element receiving power from such a power supplier may involve determining a percentage of power supplied by one or more power sources and the carbon footprint associated with a unit of power for one or more power sources. One or more carbon footprint metrics such as, but not limited to, the amount of $CO_2$ emissions per kilowatt may be provided by a power supplier to its customer.

One or more network elements 110, 114, 118, and 126 may be capable of identifying power usage metrics and/or carbon footprint metrics of network element components. A network element, such as network elements 110, 114, 118, and 126, may be able to determine power usage of a component such as a hard drive, a network interface card, a processor, memory, a power supply, displays, interface cards, peripherals, fans and other components. A network element may determine power usage for an associated task, such as transferring a packet, instantiating a process or retrieving data. A network element may also determine power usage as overall power usage for a specified time period. Power usage may be attributed to a requestor of a task or service, power usage may be divided among a number of users of a network element or component for a specified time period or other methods of attributing power usage to a user, task or service may be utilized. Measurements of power usage for a network component may determine usage by measuring one or more components utilized for a process. For example, a network element, such as network element 110, may be a server. Network element 110 may receive a request for data such as an hypertext transfer protocol (HTTP) request from network client 102 over network path 104. Network element 110 may measure the power usage of a processor, a hard drive, memory, and other components utilized to service the request. Network element 110 may also consider power usage of components that are part of the overhead for the device, such as a fan, a user interface or peripherals. Such overhead usage may be pro-rated based on the number of users of the network element.

Power usage may be calculated based on actual usage of components, it may also be calculated based on statistical usage of the components or stored data about the components. For example, network element 110 may contain or may access a manufacturer's specifications on component power usage for one or more individual components and may measure usage based on the specified power usage of the components for a unit of time multiplied by the number of units of time that the one or more components is utilized for a particular process or service. Network element 110 may also utilize statistics based on measurements of other network components by a manufacturer, an independent lab, a network service provider, a network component reseller or other entity that indicate component power usage. Network element 110 may utilize statistics based on power usage of one or more components, based on historical measurements of the actual network element, or based on measurements of similar network elements. Network element 110 may utilize statistics estimating power usage for a particular process or service. For example, network element 110 may be a server receiving an HTTP request and it may calculate power usage for the HTTP request based on statistics related to the measured or calculated power usage of HTTP requests for this network element 110 historically or for similar network elements. Statistics may be further categorized by types of requests. Network element 110 may determine whether an HTTP request required disk access, was serviced from memory, the length of disk access required, the length of processor time utilized for the request or other factors related to the request. Thus power usage may be calculated based on individual component usage, based on a service or process requested or based on a combination of an estimate of service or process power usage and component power usage.

In some embodiments, the granularity or level of detail for which power usage is calculated may be determined in part based on the amount of power used to calculate the power usage of a process. Although detailed actual measurements may be possible at the component level, estimated process power usage calculations may be utilized in order to reduce the amount of power required to perform one or more power usage calculations. The detail level at which power metrics and/or carbon footprint metrics are calculated may be related to the potential savings of such metrics. If calculating actual power usage at a component level would use more power than potential savings from the actual usage measurements, an estimate based on previous measurements, manufacturer's component specifications, or other sources may be utilized. Measurements of component power usage and/or estimates of component power usage may be stored in one or more data storage mechanisms, such as data storage mechanisms 112, 116 and 120. When calculating power usage of a component, a process may utilize stored measurements or actual measurements and may reduce the power required to estimate the power usage of the component. A process may also reduce the power required to calculate the power usage of a network element or a network service by calculating power usage based on estimates related to a network element level or a network service level instead of a component level or a processing step level. For example, a process for measuring power usage or a carbon footprint of a HTTP process may calculate the power usage based on statistics related to HTTP requests instead of statistics related to the individual components and/or processing steps.

In one or more embodiments, overhead for a network element may be factored into a power calculation for a process performed by the network element. For example, if network element 114 is a router transferring a packet, a power calculation performed by network element 114 may calculate not only the power usage of components utilized to transfer the packet but also the power usage of supporting components. Supporting components may include overhead components of network element 114, such as a power supply, a display and a fan. Supporting components may also include components external to network element 114, such as uninterruptible power supplies, server racks, and network facilities. External components may include facilities utilized for the overall support of the networking operations, such as billing servers or customer service facilities. The power usage of overhead components may be pro-rated among network elements or users of network elements using one or more algorithms. For example, the estimated power usage of a networking facility may be pro-rated among network elements that a facility supports which may enable network elements to attribute it to one more individual services or requests handled. The power usage of a networking facility or other overhead component may also be attributed to one or more customers utilizing one or more network services provided at least in part by the network facility. In one or more embodiments, a network element may factor in one or more overhead power costs when calculating the power cost of a process or service. In one or more embodiments, one or more centralized servers may calculate overhead power costs. Overhead power costs may also be calculated by applications receiving data on power usage related to one or more network services, network processes or network elements. For example, network management or monitoring programs may calculate power usage of a network service performed by one or more network elements and may include a portion of overhead power usage.

Network elements 110, 114, 118, and 126 may provide application programming interfaces (APIs), interface tables, remote procedure calls (rpcs), web services, Extensible Markup Language (XML) based interfaces, Simple Object Access Protocol (SOAP) based interfaces and other interfaces for sending or receiving power usage information information. Network elements 110, 114, 118, and 126 may receive data from power providers, other network elements, network management applications or other network elements. Network elements 110, 114, 118, and 126 may store information related to power consumption, carbon footprints, or other network or device related information in one or more data storage mechanisms, such as data storage mechanisms 112, 116 and 120. In some embodiments, network elements may provide access to data storage mechanisms via the simple network management (SNMP) protocol.

Data storage mechanisms 112, 116 and 120 may be databases, file servers, storage area networks or other storage devices. Data storage mechanisms 112, 116 and 120 may be management information bases (MIBs) and may contain information about network elements 110, 114, 118, and 126 which may facilitate network management. Data storage mechanisms 112, 116 and 120 may store one or more measurements or estimates of power usage for a process or a component associated with network elements 110, 114, 118, and 126. Carbon footprint metrics and/or power usage metrics of processing steps at servers, of packets at network elements, of circuits at network elements, and of network service instantiations, may be stored. MIBs may enable simple network management (SNMP) protocol information to be transmitted from managed objects, such as network elements, to network monitoring systems or other systems requesting information. Other data storage mechanisms may be utilized, such as databases storing statistical information on power metrics or carbon footprint metrics of one or more network components or processes. This statistical information may enable network elements to track or calculate the length of usage of a component, the type of service provided or other details and utilize stored usage information in order to calculate the power usage of one or more components or services of a network element.

Power consumption metrics and/or carbon footprint metrics may be calculated for a process or service provided at a network element, such as a processing step at a server or transmitting a packet from a router. Power consumption and/or carbon footprint metrics may also be calculated on an end to end basis such as the power consumption to transmit a packet from an originating network element to a destination network element or the carbon footprint of a network service provided to a user. Power consumption metrics and/or carbon footprint metrics may be calculated by summing metrics of the service from one or more network elements. For example, the power consumption metrics and/or carbon footprint metrics of a packet sent from network client 102 to network element 126 may be calculated by determining the metrics at network client 102, along network path 106, at network element 114 and at network element 126. Network path 106 may contain multiple components, including customer premise equipment, routers, gateways, repeaters, hubs, signaling servers, and other network components whose power usage and/or carbon footprint metrics may be calculated when determining power consumption metrics and/or carbon footprint metrics of network path 106. In some embodiments, calculating the metrics of a packet from network client 102 to network element 126 may include metrics of a client machine and a destination machine, in other embodiments calculations may include metrics only for network elements within a service provider, network owner or network operator's network. Network clients for which metrics are calculated may include any user of network connectivity, for example telephones using voice over IP (VOIP) services, televisions receiving broadband programming and other users of network connectivity. Power consumption metrics and/or carbon footprint metrics may be calculated for one or more processes of a network service. For example, if network element 110 is a web server handling search requests, metrics may be calculated for the receipt of the search request, the processes necessary to perform the search and the processes necessary to handle and return the results. Metrics may be calculated for the transmission of the request and the results and may be summed with the metrics calculated for the processing to give an overall picture of the power consumption and/or carbon footprint of the search request.

The power usage metrics and/or carbon footprint metrics of a service or process may be calculated by querying one or more data storage mechanisms associated with a network element, such as a management information base (MIB). The metrics may also be calculated and communicated as part of the process. For example, carbon footprint metrics or power usage metrics associated with a packet may be stored in an optional or unused packet header field. This carbon footprint field and/or power usage field may be utilized to signal the carbon footprint and/or power usage of a packet at a network element, of a processing step at a server, or of a network service instantiation. The use of a packet header field may be used to calculate end to end carbon footprint or power usage metrics for network services such as, but not limited to, a transmission control protocol connection, a user datagram protocol connectionless interaction, a hypertext transfer protocol connection, a user datagram protocol streaming operation, a file transfer, a video on demand download, a plain old telephone system (POTS) call, a voice over Internet protocol (VOIP) call, a cellular call, an instant message, an IPTV program, a HDTV program broadcast, a web service interaction, and a web search engine interaction.

In one or more embodiments, Network elements 110, 114, 118, and 126 may query one or more external sources of information to gather power usage and/or carbon footprint information. For example, network element 118 may gather information from data storage mechanism 120 or from an external web site regarding statistical power usage of network components and/or carbon footprint metrics. Additionally, network elements 110, 114, and 126 may access other sources of information to calculate power usage and/or carbon footprint metrics.

One or more components of a network may utilize carbon footprint metrics to reduce or minimize the carbon footprint of one or more network services or processes. One or more network elements may enable carbon footprint routing, which may utilize carbon footprint metrics, power usage metrics, or other metrics to route packets along network paths which will result in a lower carbon footprint from the packet transmission and/or handling. Carbon footprint routing may also lower carbon footprints by routing a service request to a server or other network element which provides lower carbon footprint processing than an alternative server or network element. In some embodiments, one or more network elements may enable routing based on power usage of network elements or processes regardless of the carbon footprint of the network elements. Routing may consider carbon footprint metrics and/or power usage metrics in conjunction with other metrics such as latency, packet loss, and throughput of network routes when determining a network route. In some embodiments, generalized multiprotocol label switching (GMPLS) networks may utilize carbon footprint metrics of packets, circuits, and network elements as routing metrics.

Network service providers, communications carriers, government entities, military entities or other entities providing network connectivity may offer reduced carbon footprint network services and/or energy efficient network services as a service feature. Entities providing network connectivity may enable one or more users of a network service to evaluate this as a metric when receiving network services either alone or in conjunction with other network metrics. Entities providing network services may enable one or more users of network services to schedule one or more network activities for certain time periods in order to reduce the carbon footprint of those activities. For example, a user may schedule upgrades, updates, backups, reporting activities, scans or other network intensive activities for periods during which a power supplier is using a power source with a lower carbon footprint or for periods during which network resources with a lower carbon footprint are available. In some embodiments, one or more entities providing network services may provide information regarding the carbon footprint and/or power usage of one or more network services or network elements and a user may utilize the information to reduce the carbon footprint and/or power usage of their network activities.

The various components of system 100 as shown in FIG. 1 may be further duplicated, combined and/or integrated to support various applications and platforms. Additional elements may also be implemented in the systems described above to support various applications.

Figure 2:
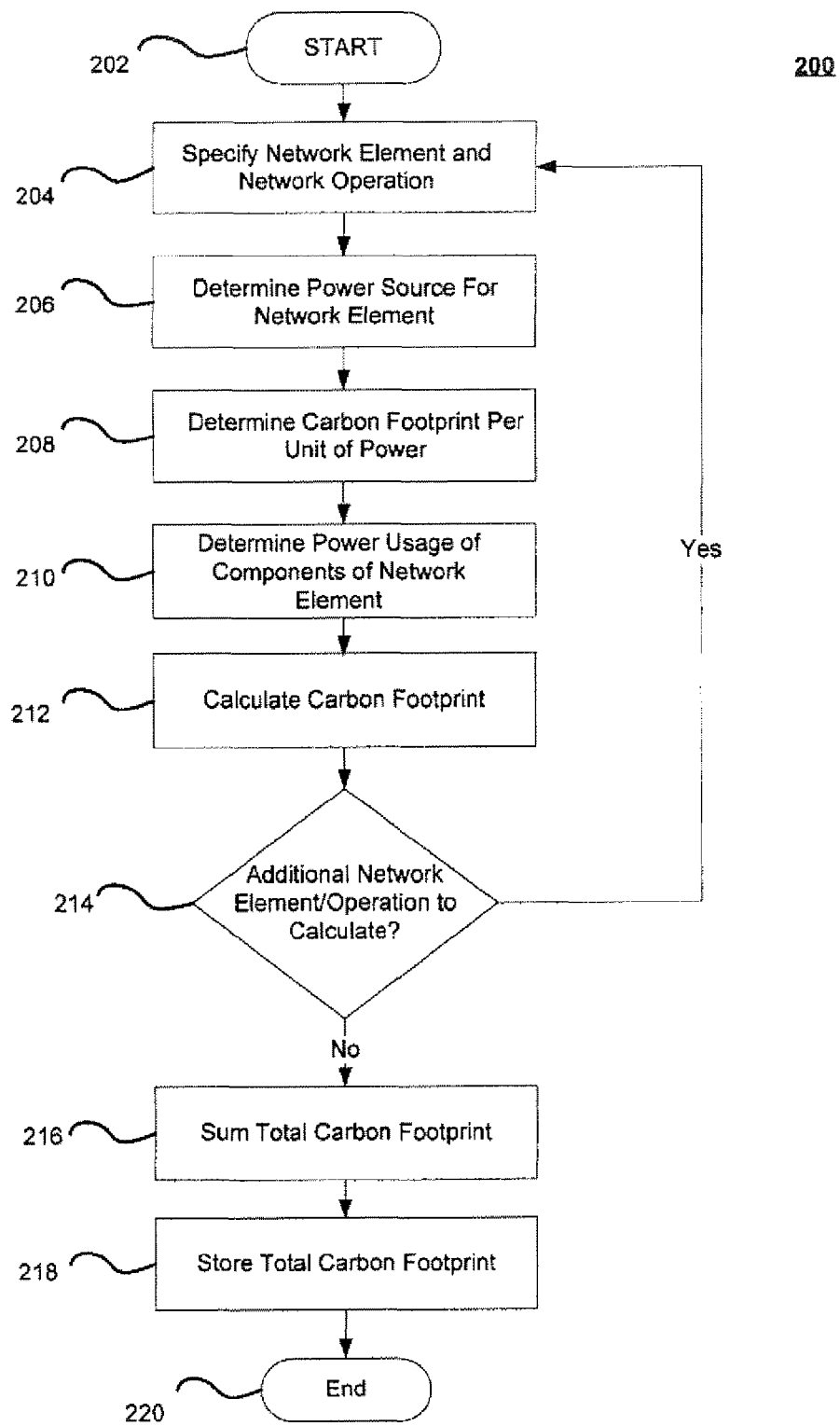
FIG. 2 depicts a method for implementing a system for energy efficient routing and network services, in accordance with an exemplary embodiment.

FIG. 2, illustrates a flow diagram of a method 200 for implementing a system 100 for energy efficient routing and network services is illustrated, in accordance with an exemplary embodiment. This exemplary method 200 is provided by way of example, as there are a variety of ways to carry out the method. The method 200 shown in FIG. 2 can be executed or otherwise performed by one or a combination of various systems. The method 200 is described below may be carried out by the energy efficient routing system 100 shown in FIG. 1 by way of example, and various elements of the energy efficient routing system 100 are referenced in explaining the example method of FIG. 2. Each block shown in FIG. 2 represents one or more processes, methods or subroutines carried out in exemplary method 200. According to one or more embodiments, method 200 may begin at block 202.

At block 204, a network element whose carbon footprint and/or power utilization is to be determined may be specified. For example, a router, an application, a network management program or other user of the method may specify a network element for which the carbon footprint is to be determined. Network elements may include components used to provide one or more network services or to support one or more network services. For example, network elements may include routers, hubs, servers, repeaters, cables, databases, domain name servers (DNS), session initiation protocol (SIP) servers, signaling system number seven (SS7) signaling servers, 800 number translation servers, gateways, softswitches, network interface cards, radio transmitters, cellular radios, link amplifiers, link regenerators and other components utilized to provide network services. Network elements may also include components that consume power in support of network services either directly or indirectly, such as uninterruptible power supplies, network monitoring systems, network service billing systems, network system facilities, and other components. Network services may include a transmission control protocol connection, a user datagram protocol connectionless interaction, a hypertext transfer protocol connection, a user datagram protocol streaming operation, a file transfer, a video on demand download, a plain old telephone system (POTS) call, a voice over Internet protocol (VOIP) call, a cellular call, an instant message, an IPTV program, a HDTV program broadcast, a web service interaction, a web search engine interaction or other network services.

At block 206, the power source for the network element may be determined. The power source may be one or more power plants or power generation system including a coal fired generating plant, a hydroelectric plant, an underground hydrothermal power generation system, a nuclear power plant, a tidal power generating system, a solar power generating system, a wind power generating system or other power generating systems. Determining a power source for a network element may involve determining a percentage of power supplied to allocated to one or more of multiple power systems. For example, power suppliers may purchase power from different power generators depending on the season, power suppliers may purchase power from multiple power suppliers during peak usage periods, power suppliers may switch sources of power in response to economic conditions, or power suppliers may switch sources of power for other factors. Network elements may be supplied power from different power sources depending on the location of a network element, a power supplier utilized by a network element or for other reasons. A provider of network services, an operator of the network element, an owner of the network element or another entity may request or receive information from a power supplier regarding one or more power sources for the network element.

At block 208, the carbon footprint per unit of power may be determined. For example, if the unit of power is determined to be a watt, it may be determined from information received from the one or more power suppliers that for one watt of power is a specified amount of carbon dioxide ($CO_2$) is produced. The carbon footprint may be averaged or otherwise adjusted to accommodate for multiple power sources or seasonal variations. The carbon footprint per unit of power may also be specified for a particular power source utilized by a power supplier at a particular point in time.

At block 210, the power usage of one or more components of a network element may be determined. This may involve determining what components of one or more network elements are utilized, the length of time the one or more components are utilized and the power usage of the one or more components. Components may include components directly involved in providing one or more network services or components supporting one or more network services. Power usage may be measured or it may be estimated utilizing statistics or specifications.

At block 212, the carbon footprint for a network element may be calculated. This may be an average carbon footprint for a network element, or it may be a specific measurement of a carbon footprint performing one or more portions of a particular network service. The power usage of the component may be multiplied by the carbon footprint per unit of power for the power utilized by that component.

At block 214, the method may determine whether the carbon footprint for additional network elements is required. For example, in order to determine the carbon footprint of sending a packet from network client 102 to network element 118, the method may determine the carbon footprint of processes required at network client 102, of one or more network elements along network path 108, and of network element 118. If the carbon footprint for additional network elements are to be calculated the method may continue at block 204. If no additional network element calculations are to be made the process may continue at block 216.

At block 216, the total carbon footprint and/or total power usage for a network service or process may be calculated. This may include the carbon footprint one or more network elements, one or more components of a network element, and/or one or more processes of a network element. A total may be based on actual or estimated power usage. The level of detail used to determine a carbon footprint may be user specified, may be determined by the power required to calculate the carbon footprint, by statistics available, by measurements available or by other factors. One or more different totals specifying different levels of detail or including different power usage factors may be calculated. For example, a total may include usage from a network provider equipment carbon footprint, customer premise equipment, other network provider equipment, network overhead or other network service related power usage. Network overhead may include power usage of facilities, machines or services used to support but not directly provide a network service.

At block 218, the total carbon footprint and/or power usage for a network service or process may be stored, reported and/or displayed. This information may be provided to one or more users of the network service or process, to a network management application, or to other entities. Reports may be provided detailing carbon footprint metrics, power usage metrics, related carbon offsets, and other power usage or impact analysis data. Reports may be provided to network users, administrators, operators and others as part of billing statements, via websites, emails or other communications.

At block 220, the method may end.

Figure 3:
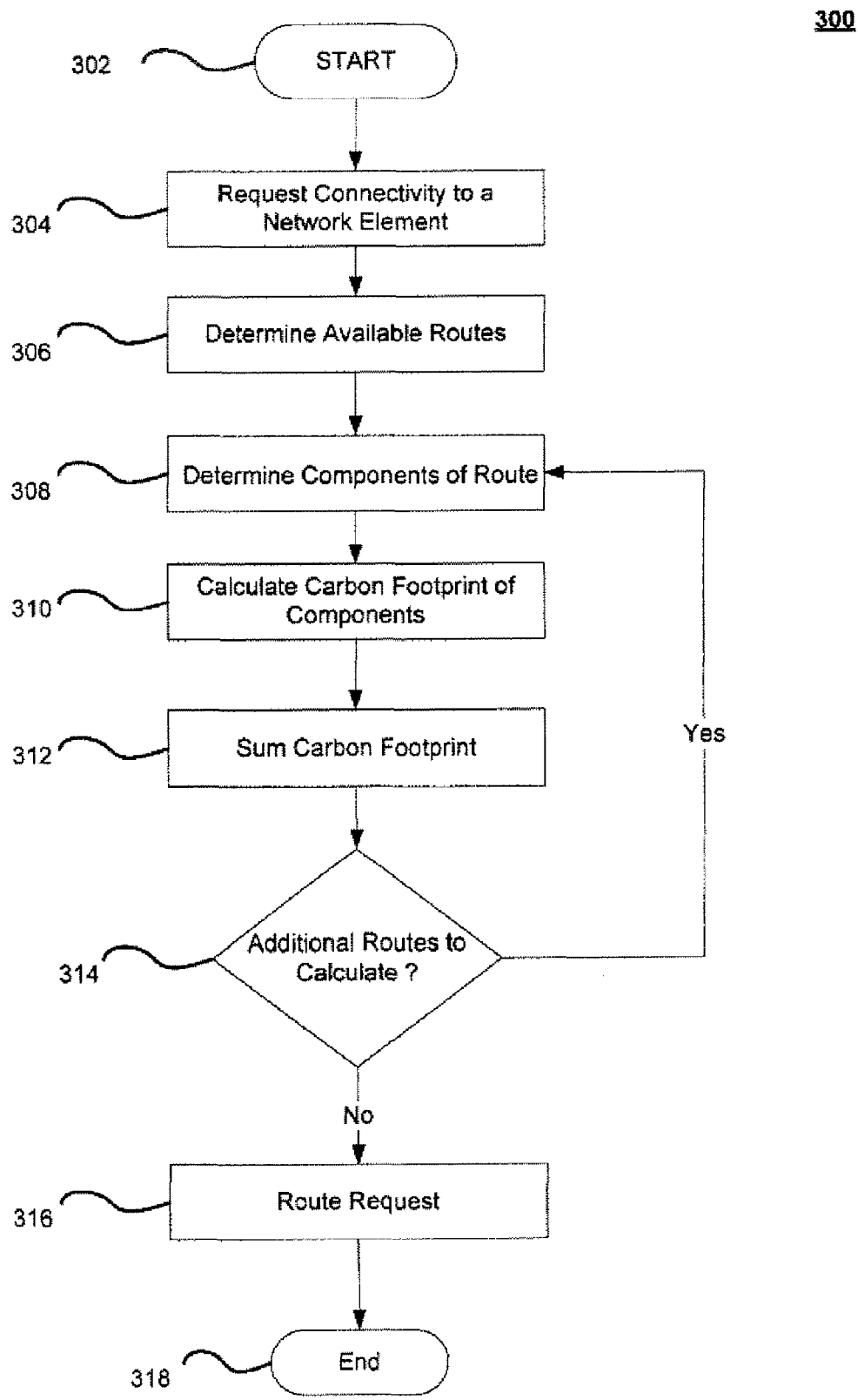
FIG. 3 depicts a method for implementing a system for energy efficient routing, in accordance with an exemplary embodiment.

FIG. 3, illustrates a flow diagram of a method 300 for implementing a system for energy efficient routing and network services is illustrated, in accordance with an exemplary embodiment. This exemplary method 300 is provided by way of example, as there are a variety of ways to carry out the method. The method 300 shown in FIG. 3 can be executed or otherwise performed by one or a combination of various systems. The method 300 is described below may be carried out by the energy efficient routing system 100 shown in FIG. 1 by way of example, and various elements of the energy efficient routing system 100 are referenced in explaining the example method of FIG. 3. Each block shown in FIG. 3 represents one or more processes, methods or subroutines carried out in exemplary method 300. According to one or more embodiments, method 300 may begin at block 302.

At block 304, a request for network connectivity at a network element may be received. For example, network element 126 may receive a request from network client 102 for connectivity to network element 114. Network client 102 may transmit one or more packets to network element 126 which are to be delivered to network element 114.

At block 306, the method may determine network routes available to access a network element. For example, network element 126 may determine that a packet may be transmitted via at least two network paths to network element 114. A packet may be transmitted via network path 106 to network element 114. A packet may also be transmitted via network path 108, network element 118 and network path 122 to network element 114.

At block 308, the components of a route, such as the network elements required to transmit provide connectivity to a destination network element may be determined. For example, network element 126 may determine the components of network path 106.

At block 310, the carbon footprints of one or more network elements along a network path may be determined. These may be determined by actual measurements of carbon footprints from the network element, by statistical estimates based on specifications for one or more network elements or by other estimates of network element power usage and the related carbon footprints. Data may be retrieved from one or more databases, such as data storage 116 and 120. Data may also be received from packet headers of one or more prior packets sent to a network element. An unused or optional field may be utilized in a packet header to store a carbon footprint of the packet. The carbon footprint field may be incremented at one or more hops of a network route and may provide a recipient of the packet with a total carbon footprint of a sent packet from the sender to a recipient. For example, network element 126 may receive a packet from network element 114 with a packet header field indicating the carbon footprint of sending the packet. A packet header field may also be used to indicate power usage of a transmitted packet. A packet header field may contain carbon footprint metrics and/or power usage metrics related to not only the transmission of a packet but also the processing of a packet. For example, a response to a request for a video on demand download may include metrics which reflect transmission, processing or both. The carbon footprint metrics in a packet may contain a portion of the overall processing of the request added to the metrics for transporting the packet.

At block 312, the total carbon footprint of a network route may be summed. For example network element 126 may sum the carbon footprint of sending a packet from network client 102, across network element 126, across network path 106 and receiving the packet at network element 114. In one or more embodiments, totals may include carbon footprints of customer premise equipment, carbon footprints of equipment used to support a network service or carbon footprints of other processes in addition to the processes directly involved in a network service.

At block 314, a determination may be made as to whether the carbon footprint or power usage of one or more additional routes need to be calculated. For example, it may be necessary to determine the carbon footprint of sending a packet from network element 126 via network route 108, network element 118 and network route 122 to network element 114. If the carbon footprint or power usage of one or more additional routes needs to be calculated, the method may continue at block 308. If no additional carbon footprints need to be calculated the method may continue at block 316.

At block 316, the packet may be routed using the calculated carbon footprints of each route as a factor in determining the route. The packet may be routed according to the lowest carbon footprint, according to a lowest average carbon footprint, according to a lowest power consumption or according to other power measurement factors. The routing may also consider additional network factors such as available bandwidth, congestion, latency and packet loss. The priority or weighting of such factors may be determined by a network operator, service provider, network owner, or a user. Ceilings and floors may be used to set absolute ranges for such factors. For example, one or more factors may have floors set to guarantee that performance is not degraded beyond a certain level. For example, a network services provider may want to reduce power costs for network services and/or routing while considering the carbon footprint as a factor in routing or providing network services. Because the two factors may not be considered synonymous due to the differing carbon footprint of different power sources, the two factors may be considered separately.

At block 318, the method may end.

The carbon footprint of a particular route may be significantly less than an alternative route that uses less power, has fewer hops, has a lower latency, and/or has less congestion. For example, the carbon footprint of sending a packet from network client 102 to network client 118 via network element 126, network path 106, network element 114 and network path 122 may be lower than the carbon footprint of sending a packet from network client 102 to network client 118 via network path 108. Network path 108 may contain one or more network elements powered by a high emission power source such as a coal burning power plant. Network paths 106 and 122 may be powered by lower emission power sources, such as a wind generation power source. In some embodiments, power consumption metrics and carbon footprint metrics may both be utilized as factors in one or more routing decisions.

Figure 4:
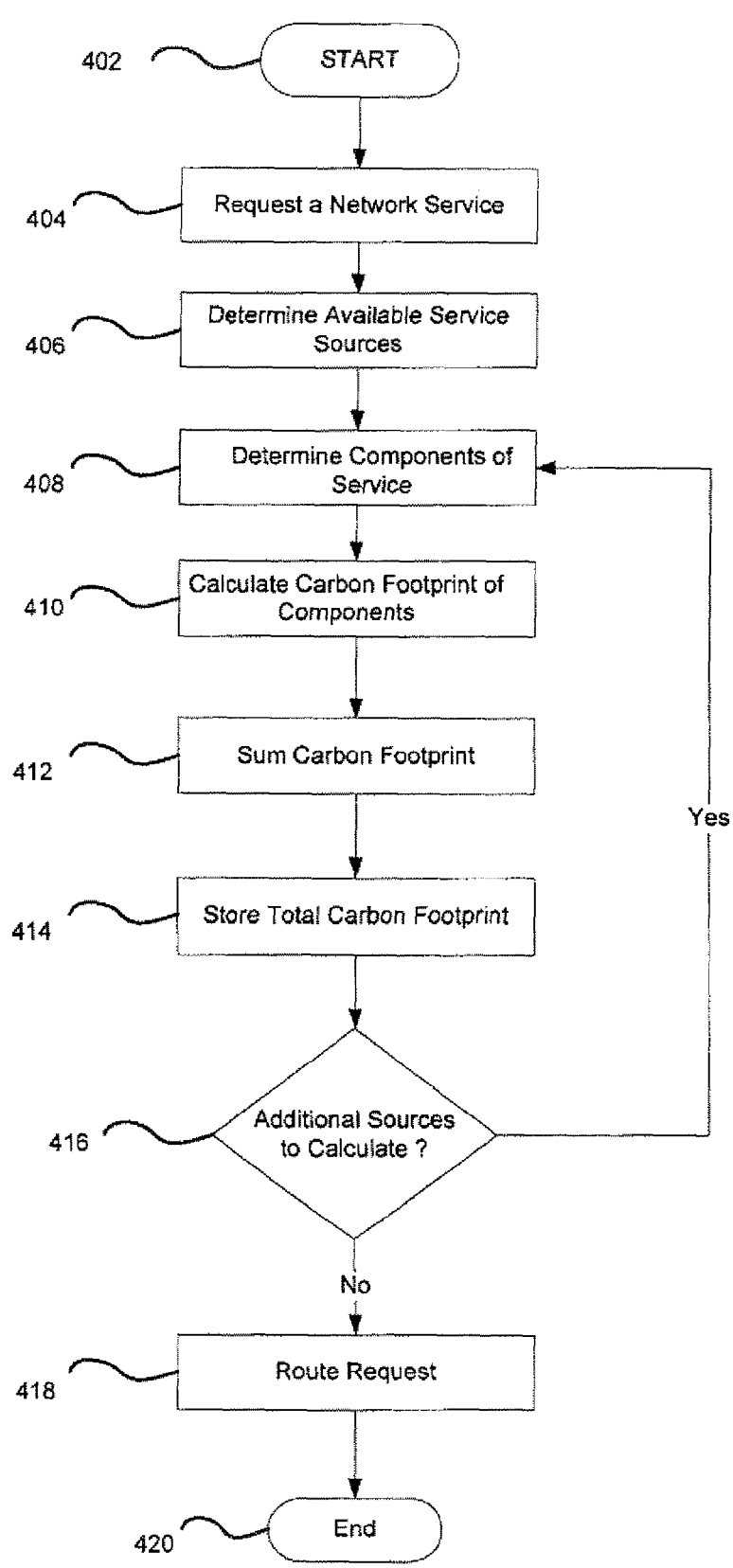
FIG. 4 depicts a method for implementing a system for energy efficient network services, in accordance with an exemplary embodiment.

FIG. 4, illustrates a flow diagram of a method 400 for implementing a system for energy efficient network services is illustrated, in accordance with an exemplary embodiment. This exemplary method 400 is provided by way of example, as there are a variety of ways to carry out the method. The method 400 shown in FIG. 4 can be executed or otherwise performed by one or a combination of various systems. The method 400 as described below may be carried out by the energy efficient routing system 100 shown in FIG. 1 by way of example, and various elements of the energy efficient routing system 100 are referenced in explaining the example method of FIG. 4. Each block shown in FIG. 4 represents one or more processes, methods or subroutines carried out in exemplary method 400. According to one or more embodiments, method 400 may begin at block 402.

At block 404, a request for network service may be received. Network services may include a transmission control protocol connection, a user datagram protocol connectionless interaction, a hypertext transfer protocol connection, a user datagram protocol streaming operation, a file transfer, a video on demand download, a plain old telephone system (POTS) call, a voice over Internet protocol (VOIP) call, a cellular call, an instant message, an IPTV program, a HDTV program broadcast, a web service interaction, a web search engine interaction or other network services.

At block 406, the method may determine available sources for the requested network service. For example, a request may be for a web search engine query. The web search engine query may be capable of being serviced by one or more network elements. The method may determine which network elements may handle the requested network service. For example, the network service may be capable of being handled by network element 110 or network element 118. The availability of network services may be determined by an application running on network client 102, by routing software, network management software, by a user presented with a list of available resources, or by a network element.

At block 408, the components of the service may be determined. For example, the components of network element 110, network path 104, network element 126 and network client 102 which may be utilized to provide the requested service, may be determined. In some embodiments, components of customer premise equipment may be determined. For example, network client 102 may represent a customer laptop with a network interface card which may be connected to the network via a broadband gateway. The power usage of these components may be factored in when determining the components. Customer premise equipment may be known through a registration process, through information provided by a customer, by the nature of the connection and equipment supported for the connection or by other methods. In one or more embodiments, only the components utilized to provide the service at the network element providing the service may be determined. For example, determination of the components utilized may determine only the components of network element 110 if that is the network element providing the service. In one or more embodiments, components utilized along the path from a network client to a service providing network element may be determined along with the components of the service providing network element.

At block 410, the carbon footprints of the components may be determined. The steps described in method 200 above may be utilized.

At block 412, the carbon footprint of the components may be summed.

At block 414, the method 400 may store the total carbon footprint and/or power usage associated with the one or more network elements providing the service. The carbon footprint and/or power usage metrics may be displayed, printed, transmitted or otherwise provided to one or more users of method 400.

At block 416, the method may determine whether the carbon footprint of any other available sources of a requested service need to be calculated. If further sources need to be calculated, the method may continue at block 408. If further sources do not need to be calculated, the method may continue at block 418.

At block 418, the request may be routed to one or more network elements providing the requested service. The network element chosen may be determined based at least in part on a carbon footprint associated with the network element. For example, a web search engine query may be routed to network element 110 for handling instead of network element 118, which may be due to a lower calculated carbon footprint for network element 110. The method 400 may be utilized to optimize and/or reduce the power usage and/or carbon footprint of a network service. Optimizing a network service may include selecting a network service instantiation based on a carbon footprint of one or more network elements providing the network service. Optimizing a network service may include the consideration of additional factors such as network performance indicators, cost, utilization and other factors.

At block 420, the method may end.

Figure 5:
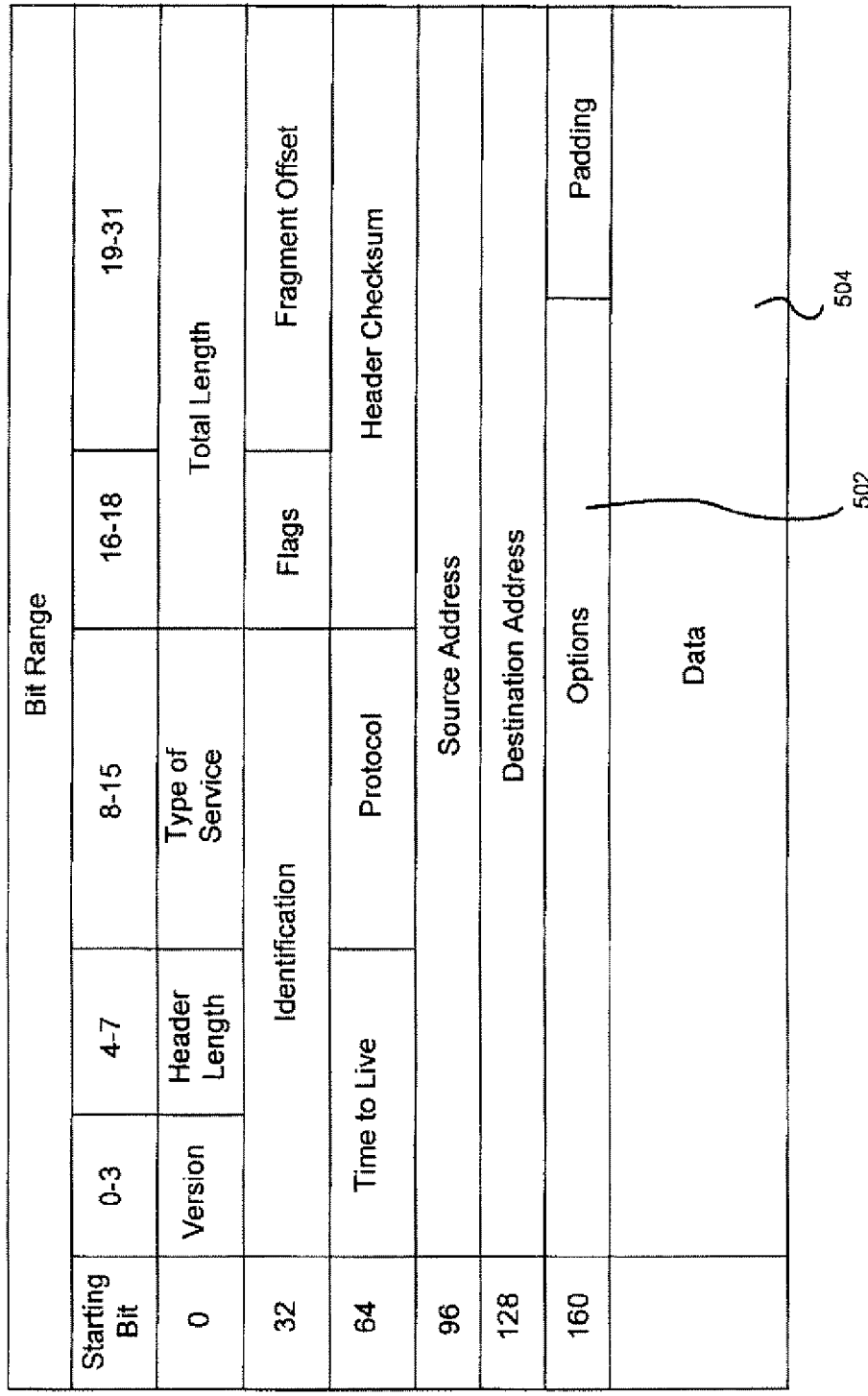
FIG. 5, is a block diagram of a data packet including metrics for energy efficient routing and network services, in accordance with an exemplary embodiment.

Referring to FIG. 5, a block diagram of a data packet including metrics for energy efficient routing and network services in accordance with an exemplary embodiment is illustrated. Packet 500 illustrates a data packet such as an Internet Protocol (IP) version 4 packet. A data packet, such as an IP packet, a Transmission Control Protocol (TCP) packet, a User Datagram Protocol (UDP) packet, or another protocol packet or transmission may be utilized to include power usage and/or carbon footprint metrics. One or more power usage and/or carbon footprint metrics may be included in one or more overhead, header, or data fields of a packet. For example, power usage and/or carbon footprint metrics may be included in an unused field such as options 502 of packet 500. In one or more embodiments, power usage and/or carbon footprint metrics may be included in a payload or data field, such as data field 504. In some embodiments, power usage and/or carbon footprint metrics may be included in initial packets of a transmission or a network service instantiation and not in subsequent packets. This may provide an initial measurement or estimate to a user, system and/or process of the power usage and/or carbon footprint of a network service or a network transmission. This may facilitate energy efficient routing and/or network services while reducing the power usage associated with determining the metrics. In some embodiments, carbon footprints and/or power usage metrics or other environmental impact or consumption metrics may be included in packets at intervals. In one or more embodiments, metrics may be included in all packets. Power usage and/or carbon footprint metrics included in one or more packet fields may enable a user, system or process utilizing a packet to efficiently transmit and/or receive information enabling energy efficient routing and network services.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
    determining, using at least one computer processor, a first carbon footprint for a network operation performed by a first network element, wherein determining a first carbon footprint comprises:
        identifying a power source used by the first network element;
        determining a carbon footprint of a unit of power usage from the power source,
        and
        calculating the first carbon footprint of the network operation performed by the first network element;
    comparing the first carbon footprint with a second carbon footprint of a network operation performed by a second network element;
    selecting one of the first network element and the second network element to perform the network operation based at least in part on a carbon footprint size; and
    basing a routing decision at least in part on the carbon footprint.

2. The method of claim 1, wherein the network operation comprises a step utilized to handle a packet.

3. The method of claim 1, wherein the network operation comprises a step utilized to perform a network service.

4. The method of claim 3, wherein the network service comprises at least one of: a transmission control protocol connection, a user datagram protocol connectionless interaction, a hypertext transfer protocol connection, a user datagram protocol streaming operation, a file transfer, a video on demand download, a plain old telephone system (POTS) call, a voice over Internet protocol (VoIP) call, a cellular call, an instant message, an IPTV program, a HDTV program broadcast, a web service interaction, and a web search engine interaction.

5. The method of claim 1, wherein the first network element comprises at least one of: a transmission link, a switch, a router, a server, a database, a network interface card, a link amplifier, a link regenerator, a radio transmitter, a cellular radio, a software-defined radio, a gateway, and a softswitch.

6. The method of claim 1, further comprising storing the calculated carbon footprint.

7. The method of claim 6, wherein the calculated carbon footprint is stored in a management information base associated with the network element.

8. The method of claim 7, wherein a generalized multiprotocol label switching network bases one or more routing decisions at least in part on the carbon footprint.

9. The method of claim 1, further comprising inserting carbon footprint data in a field of a packet.

10. The method of claim 9, further comprising utilizing the carbon footprint data in a field of a packet for signaling the carbon footprint of at least one of: a packet at a network element, a processing step at a server element, and a network service.

11. The method of claim 9, further comprising offering carbon reduced networking as a service feature to a consumer.

12. The method of claim 6, further comprising utilizing the calculated carbon footprint for network monitoring.

13. The method of claim 1, further comprising identifying a plurality of power sources utilized by a network element and determining at least one of: the percentage of power obtained from one or more power sources, the time of day one or more power sources are utilized, the time of year one or more power sources are utilized, and a condition prompting a power supplier to utilize one or more power sources.

14. The method of claim 13, further comprising reducing a carbon footprint of a network service based at least in part on scheduling a time of a network service.

15. A non-transitory computer readable media comprising code to perform the acts of the method of claim 1.

16. A method, comprising:
  calculating, using at least one computer processor, a first carbon footprint of a network service performed by a first set of network elements, wherein calculating a first carbon footprint comprises:
    identifying a power source used by the first network element;
    determining a carbon footprint of a unit of power usage from the power source,
    and
    calculating the first carbon footprint of the network operation performed by the first network element;
  comparing the first carbon footprint with a second carbon footprint of a network service performed by a second set of network elements;
  selecting one of the first set of network elements and the second set of network elements to perform the network service based at least in part on a carbon footprint size; and
  basing a routing decision at least in part on the carbon footprint.

17. The method of claim 16, wherein the network service comprises at least one of: a transmission control protocol connection, a user datagram protocol connectionless interaction, a hypertext transfer protocol connection, a user datagram protocol streaming operation, a file transfer, a video on demand download, a plain old telephone system (POTS) call, a voice over Internet protocol (VoIP) call, a cellular call, an instant message, an IPTV program, a HDTV program broadcast, a web service interaction, and a web search engine interaction.

18. The method of claim 16, further comprising optimizing network service instantiations based at least in part on the calculated carbon footprint of the network service.

19. The method of claim 16, further comprising calculating a carbon footprint of one or more components utilized to support the network service.

20. A system, comprising:
  a processor communicatively coupled to a network wherein the processor is configured to:
    calculate a first carbon footprint of the network operation performed by a first network element, wherein calculating a first carbon footprint comprises:
      identifying a power source used by the first network element;
      determining a carbon footprint of a unit of power usage from the power source, and
      calculating the first carbon footprint of the network operation performed by the first network element;
    compare the first carbon footprint with a second carbon footprint of a network operation performed by a second network element;
    select one of the first network element and the second network element based at least in part on a carbon footprint size;
    base a routing decision at least in part on the carbon footprint; and
  a storage mechanism for storing one or more carbon footprints.

21. The system of claim 20, wherein the network operation comprises a step utilized to handle a packet.

22. The system of claim 20, wherein the network operation comprises a step utilized to perform a network service.

* * * * *